(12) United States Patent
Beal et al.

(10) Patent No.: US 6,737,031 B2
(45) Date of Patent: May 18, 2004

(54) METHOD OF SIMULTANEOUSLY REDUCING $CO_2$ AND $SO_2$ EMISSIONS IN A COMBUSTION INSTALLATION

(75) Inventors: Corinne Beal, Voisins le Bretonneux (FR); Jean-Xavier Morin, Neuville aux Bois (FR); Michel Vandycke, Gambais (FR)

(73) Assignee: Alstom Power NV, Amsterdam (NL)

( * ) Notice: Subject to any disclaimer, the term of this patent is extended or adjusted under 35 U.S.C. 154(b) by 249 days.

(21) Appl. No.: 09/951,389

(22) Filed: Sep. 14, 2001

(65) Prior Publication Data

US 2002/0037246 A1 Mar. 28, 2002

(30) Foreign Application Priority Data

Sep. 27, 2000 (FR) .............................. 00 12288

(51) Int. Cl.[7] .................... C01B 17/16; C01B 17/22; B01J 8/00
(52) U.S. Cl. ............ 423/230; 423/243.08; 423/244.01; 423/244.07; 423/244.08; 423/244.09
(58) Field of Search .................... 423/230, 243.08, 423/244.01, 244.07, 244.08, 244.09

(56) References Cited

U.S. PATENT DOCUMENTS

| | | | | |
|---|---|---|---|---|
| 3,883,639 A | * | 5/1975 | Cronkright et al. | .... 423/243.02 |
| 4,226,839 A | * | 10/1980 | O'Neill et al. | .............. 423/177 |
| 4,452,766 A | * | 6/1984 | Pike | ....................... 423/243.09 |
| 4,469,033 A | | 9/1984 | Michelfelder et al. | |
| 4,867,955 A | | 9/1989 | Johnson | |
| 5,126,300 A | * | 6/1992 | Pinnavaia et al. | ............. 502/84 |
| 5,662,051 A | * | 9/1997 | Morin | ......................... 110/344 |
| 5,958,353 A | | 9/1999 | Eyal | |
| 6,290,921 B1 | * | 9/2001 | Kuivalainen et al. | ........ 423/210 |
| 6,389,995 B1 | * | 5/2002 | Adams et al. | ............... 110/245 |

FOREIGN PATENT DOCUMENTS

| | | |
|---|---|---|
| EP | 0 815 922 A | 1/1998 |
| WO | WO 85 02453 A | 6/1985 |

OTHER PUBLICATIONS

US 2002/0037246 A1 Mar. 28, 2002 Beal et al 09/951,389.*

* cited by examiner

Primary Examiner—Steven Bos
Assistant Examiner—William G. Wright, Sr.
(74) Attorney, Agent, or Firm—Sughrue Mion, PLLC

(57) ABSTRACT

The method of simultaneously reducing carbon dioxide ($CO_2$) emissions and sulfur dioxide ($SO_2$) emissions produced by the combustion of carbon-containing matter in a hearth consists in injecting into the hearth a calcium-based agent, a fraction of which absorbs $SO_2$ after decarbonization, and then, after the flue gases have been subjected to intermediate cooling, in causing them to transit via a first reactor and in putting them in contact therein with the other fraction of the absorbant that has not reacted with $SO_2$ so as to capture $CO_2$ from the flue gases by carbonization, then, in a separator, in extracting the solids contained in the flue gases output from the first reactor so as to subject them to heat treatment in a second reactor in order to extract $CO_2$ therefrom by decarbonization and in order to recycle the resulting regenerated $CO_2$ absorbant to the first reactor.

15 Claims, 1 Drawing Sheet

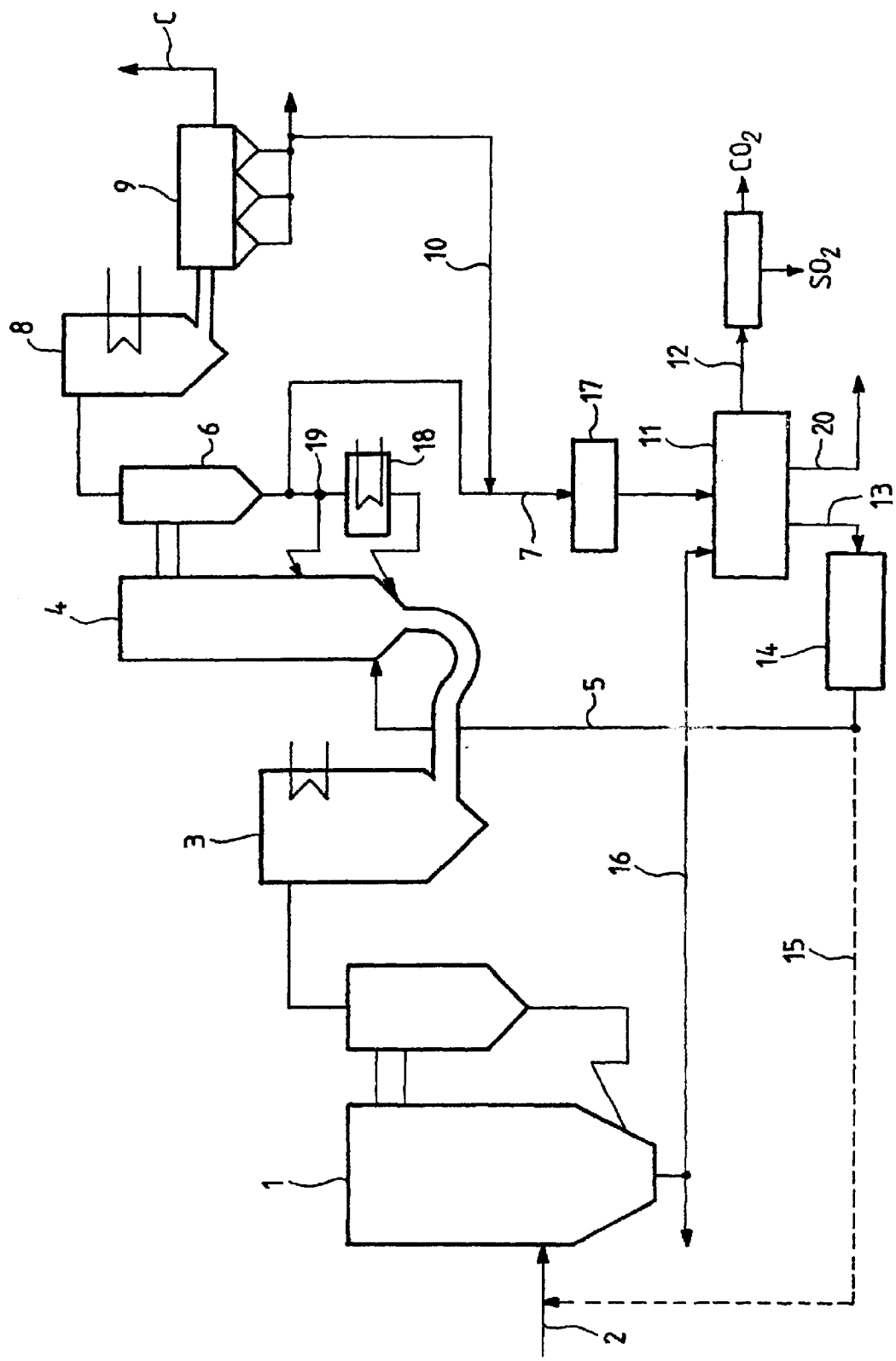

METHOD OF SIMULTANEOUSLY REDUCING CO₂ AND SO₂ EMISSIONS IN A COMBUSTION INSTALLATION

The invention relates to installations for burning carbon-containing matter, e.g. fossil fuels or waste, in a hearth, in particular a hearth operating as a fluidized bed. More particularly, it relates to a method of reducing both carbon dioxide ($CO_2$) emissions and also sulfur dioxide ($SO_2$) emissions in the flue gases produced by this type of installation.

BACKGROUND OF THE INVENTION

It is known that the combustion of fossil fuels such as coal or waste produces gaseous emissions of $CO_2$ and of $SO_2$, and that injecting calcium carbonate ($CaCO_3$) into the hearth makes it possible to reduce $SO_2$ emissions in situ. Unfortunately, such reduction in $SO_2$ is accompanied by production of $CO_2$ in addition to the $CO_2$ coming from the combustion of the carbon-containing matter. $CO_2$ is a "greenhouse" gas which would appear to contribute to global warming.

In addition, injecting calcium carbonate for desulfurizing the flue gases suffers from the drawback of producing, in the hearth, a large quantity of ash that is too rich in calcium sulfate ($CaSO_4$) and in lime (CaO) to be easy to recycle.

OBJECTS AND SUMMARY OF THE INVENTION

An object of the invention is to remedy those drawbacks.

To this end, the invention provides a method of simultaneously reducing carbon dioxide emissions and sulfur dioxide emissions produced by the combustion of carbon-containing matter in a hearth, said method consisting in injecting into the hearth a calcium-based agent, a fraction of which absorbs $SO_2$ after decarbonization, and then, after the flue gases have been subjected to intermediate cooling, in causing them to transit via a first reactor and in putting them in contact therein with the other fraction of the absorbant that has not reacted with $SO_2$ so as to capture $CO_2$ from the flue gases by carbonization, then, in a separator, in extracting the solids contained in the flue gases output from the first reactor so as to subject them to heat treatment in a second reactor in order to extract $CO_2$ therefrom by decarbonization and in order to recycle the resulting regenerated $CO_2$ absorbent to the first reactor.

BRIEF DESCRIPTION OF THE DRAWING

An implementation of the method of the invention is described in more detail below with reference to the sole FIGURE.

MORE DETAILED DESCRIPTION

Combustion of carbon-containing matter such as fossil fuels or waste produces gaseous emissions of $CO_2$ and of $SO_2$. In known manner, combustion in a fluidized bed, for example, makes it possible to obtain effective desulfurization of the flue gases when an absorbant based on calcium such as calcium carbonate is injected into the hearth, such desulfurization taking place by means of the following reactions:

$$CaCO_3 \rightarrow CaO + CO_2 \text{ (decarbonization)}$$

$$CaO + SO_2 + \tfrac{1}{2}O_2 \rightarrow CaSO_4$$

Such fluidized bed combustion thus suffers from the drawback that it generates $CO_2$ in addition to the $CO_2$ that results from burning the organic carbon of the fuel.

It is also known that $CO_2$ is a "greenhouse" gas whose concentration in the atmosphere is increasing, which could contribute to global warming. A second drawback of such fluidized bed combustion lies in the quantity of ash produced that is rich in $CaSO_4$ and in CaO, which could limit the use of such ash.

The invention makes it possible to minimize those drawbacks firstly by significantly reducing $CO_2$ emissions coming from the decarbonization of the calcium carbonate, and from the oxidation of the organic carbon, and secondly by making it possible for the absorbant to be regenerated. The basic idea of the invention is to use the surplus CaO in the ash to capture $CO_2$ from the flue gases.

As shown in the FIGURE, calcium carbonate 2 is injected as an absorbing agent into the hearth 1, which, in this example is a circulating fluidized bed hearth. This hearth, which operates at a temperature of about 850° C., is provided with a particle separator of the cyclone type which returns the particles to the bottom of the hearth. The flue gases produced at the output of the hearth are charged with CaO and they pass through a recuperator boiler 3 so as to lower their temperature to within the range 800° C. to 400° C., and typically to 650° C. The resulting cooled flue gases charged with CaO penetrate into the reactor 4 into which the regenerated absorbing agent 5 is re-injected as indicated below. The regenerated absorbing agent 5 is made up in part by the fraction of the absorbing agent 2 that has not reacted with $SO_2$ in the hearth 1. While in the reactor 4, the flue gases are put in contact with the regenerated absorbing agent and with the CaO contained in the incoming flue gases so as to capture $CO_2$ contained in the flue gases, by means of the following reaction:

$$CaO + CO_2 \rightarrow CaCO_3 \text{ (carbonization)}$$

The solids present in the outgoing flue gases that leave the reactor 4 are extracted in part in a gas/solid separator 6, e.g. a cyclone.

For example, the reactor 4 and the associated separator 6 may be a re-circulating fast fluidized bed reactor characterized by a gas transit time dependent on the desired $CO_2$ capture efficiency. Typically the $CO_2$ capture efficiency lies in the range 20% to 80%, with gas transit times shorter than 10 seconds, and with solid transit times of several minutes.

Under the separator 6, the reactor 4 may include a particle heat exchanger 18 and an outlet valve 19 having an adjustable flow rate, making it possible to adjust the temperature in the reactor 4 so as to optimize the exothermic $CO_2$ absorption reaction and the temperature in the reactor 11, the re-circulation to the reactor 4 serving to increase the time during which the CaO transits through the reactor 4. More particularly, the valve 19 is disposed between the separator 6 and the particle heat exchanger 18 in which a fraction of the solids output from the separator 6 is cooled before being re-injected into the reactor 4.

On leaving the separator 6, the flue gases with part of the $CO_2$ content removed go through a second recuperator boiler 8 in which they are cooled conventionally to about 120° C., and they then go through a final dust filter 9 before they are released into the atmosphere via a chimney at C. The solids 10 collected in the dust filter 9 are in part recycled and mixed with the solids 7 output by the separator 6, in a reactor 11 heated to a temperature higher than the temperature of the reactor 4, and typically higher than 800° C., so as to enable $CO_2$ to be released by means of the following reactions:

$$CaCO_3 \rightarrow CaO + CO_2 \text{ (decarbonization)}$$

By further increasing the temperature in the reactor 11, it is possible to cause $SO_2$ to be released as well.

In a variant, by pre-treating the solids 7 and 10, e.g. with water in an enclosure 17, before they are sent to the reactor 11, it is possible to reduce the operating temperature of the reactor 11.

The gas 12 produced by the reactor 11 is essentially a mixture of $CO_2$ and of $SO_2$. These two components can be separated from each other at 12 for subsequent use or for underground storage.

The solids 13 extracted from the reactor 11 and containing a high proportion of CaO are optionally treated in an enclosure for the purpose of improving their reactivity for $CO_2$ and $SO_2$ capture, e.g. by adding water or water vapor or by adding a reaction promoter such as sodium salts, before they are returned to the reactor 4 or to the hearth 1. In addition, in the enclosure 14, the solids may be cooled so as to facilitate transporting them. It is therefore in the reactor 11 that the $CO_2$ absorbant is regenerated so as to be recycled to the reactor 4.

In order to minimize the consumption of calcium carbonate 2, a small fraction of the solids 13 is recycled to the hearth 1. A fraction 16 of the ash usually extracted from the fluidized bed at the bottom of the hearth 1 may be re-injected into the reactor 11.

The reactor 11 is preferably equipped with a bleed outlet 20 making it possible to extract the surplus solids if necessary in order to regulate the solids content of the reactor 4. The grain-size of the absorbing agent 2 is adjusted by grinding so as to optimize the quantity of absorbing agent contained in the flue gases that are released from the hearth 1.

The absorbing agent 2 injected into the hearth 1 may advantageously be dolomite containing magnesium carbonate, which makes it possible to reduce the operating temperature of the reactor 11, and to reduce the decarbonization energy required. More generally, the agent 2 may be an alkaline earth which behaves in the same way as calcium carbonate but at different temperatures.

The invention is not limited to fluidized bed combustion. It is applicable to various combustion modes, in particular using powdered coal, and more generally to treating flue gases containing $CO_2$ produced by a combustion hearth into which an absorbant is injected.

The method of the invention is applicable to an existing installation having a recuperator boiler 3 by making a relatively simple adaptation to the boiler so as to couple it to the reactor 4.

What is claimed is:

1. A method of simultaneously reducing carbon dioxide ($CO_2$) emissions and sulfur dioxide ($SO_2$) emissions from flue gases produced by the combustion of carbon-containing matter in a hearth, said method comprising the steps of:

injecting into the hearth a calcium-based agent, a fraction of which absorbs $SO_2$ after decarbonization;

causing the flue gases, after the flue gases have been subjected to intermediate cooling, to transit via a first reactor and putting the flue gases in contact therein with the other fraction of the absorbant that has not reacted with $SO_2$ so as to capture $CO_2$ from the flue gases by carbonization; and extracting, in a separator, the solids contained in the flue gases output from the first reactor so as to subject the solids to heat treatment in a second reactor in order to extract $CO_2$ therefrom by decarbonization and in order to recycle the resulting regenerated $CO_2$ absorbant to the first reactor.

2. The method of claim 1, in which the flue gases output from the separator are sent to a dust filter, and part of the solids extracted from the dust filter are mixed with the solids extracted from the separator before being subjected to heat treatment in the second reactor.

3. The method of claim 2, in which the flue gases output from the separator are cooled in a recuperator boiler before being sent into the dust filter.

4. The method of claim 1, in which, before the solids are sent to the second reactor, their temperature is reduced in a first enclosure by treatment with water.

5. The method of claim 1, in which a fraction of the solids output from the second reactor is re-injected into the hearth.

6. The method of claim 1, in which a fragment of the ash taken from the hearth is sent to the second reactor.

7. The method of claim 1, in which the solids output from the second reactor are treated in a second enclosure so as to improve their reactivity before being re-injected into the hearth or into the first reactor.

8. The method of claim 7, in which the solids are reactivated in the second enclosure by adding alkaline salts.

9. The method of claim 1, in which a fraction of the solids output from the separator is re-injected into the first reactor via a valve having an adjustable flow rate.

10. The method of claim 1, in which a fraction of the solids output from the separator is cooled in a solid particles heat exchanger and is then re-injected into the first reactor.

11. The method of claim 1, in which the first reactor is a fluidized bed reactor.

12. The method of claim 1, in which the hearth is a circulating fluidized bed hearth.

13. The method of claim 1, in which the absorbant is calcium carbonate.

14. A method of simultaneously reducing carbon dioxide ($CO_2$) emissions and sulfur dioxide ($SO_2$) emissions from flue gases produced by the combustion of carbon containing matter in a hearth, said method comprising the steps of: Injecting into the hearth an alkaline earth based agent, a fraction of which absorbs $SO_2$ after decarbonization; causing the flue gases, after the flue gases have been subjected to intermediate cooling, to transit via a first reactor and putting the flue gases in contact therein with the other fraction of the absorbent that has not reacted with $SO_2$ so as to capture $CO_2$ from the flue gases by the carbonization; and extracting in a separator, the solids contained in the flue gases output from the first reactor so as to subject the solids to heat treatment in a second reactor in order to extract $CO_2$ therefrom by decarbonization and in order to recycle the resulting regenerated $CO_2$ absorbent to the first reactor.

15. The method of claim 14, in which the absorbant is dolomite.

* * * * *